United States Patent [19]
Zinno et al.

[11] 3,807,591
[45] Apr. 30, 1974

[54] CRANE, TRANSPORT TRUCK AND THE LIKE, TRAVELLING ON TYRE WHEELS

[75] Inventors: Oscar Zinno, Genova Quinto; Silvio Maia, Milano, both of Italy

[73] Assignee: Costruzioni Meccaniche Industriali Genovesi C.M.I., Genova-Fegino, Italy

[22] Filed: Sept. 13, 1971

[21] Appl. No.: 179,887

[30] Foreign Application Priority Data
Sept. 19, 1970 Italy.................................. 12930/70

[52] U.S. Cl...................... 214/394, 180/21, 186/26
[51] Int. Cl............................................. B60p 1/00
[58] Field of Search ...... 180/21, 25 R, 26; 214/392, 214/394, 396

[56] References Cited
UNITED STATES PATENTS
3,040,510   6/1962   Lely............................ 180/25 R X
1,621,856   3/1927   Sedgwick..........................180/25
2,740,486   4/1956   Wayman........................... 180/25 R
1,592,269   7/1926   Horine........................... 180/25 R FOREIGN PATENTS OR APPLICATIONS
1,118,704   7/1968   Great Britain........................ 180/21

Primary Examiner—Albert J. Makay
Attorney, Agent, or Firm—Albert C. Nolte, Jr.; Edward B. Hunter; Charles B. Hamburg

[57] ABSTRACT

The invention relates to a tyre-wheeled crane, transport truck or other vehicle comprising a single driving wheel and a single swerving control to actuate simultaneously two guide wheels and leaving free, under the vehicle base, a large arc allowing the passage of vehicles and loads of any size. Further the crane according to the invention is capable of rotating with it's base around a point anyhow arranged, e.g., coincident with the center of said base.

6 Claims, 14 Drawing Figures

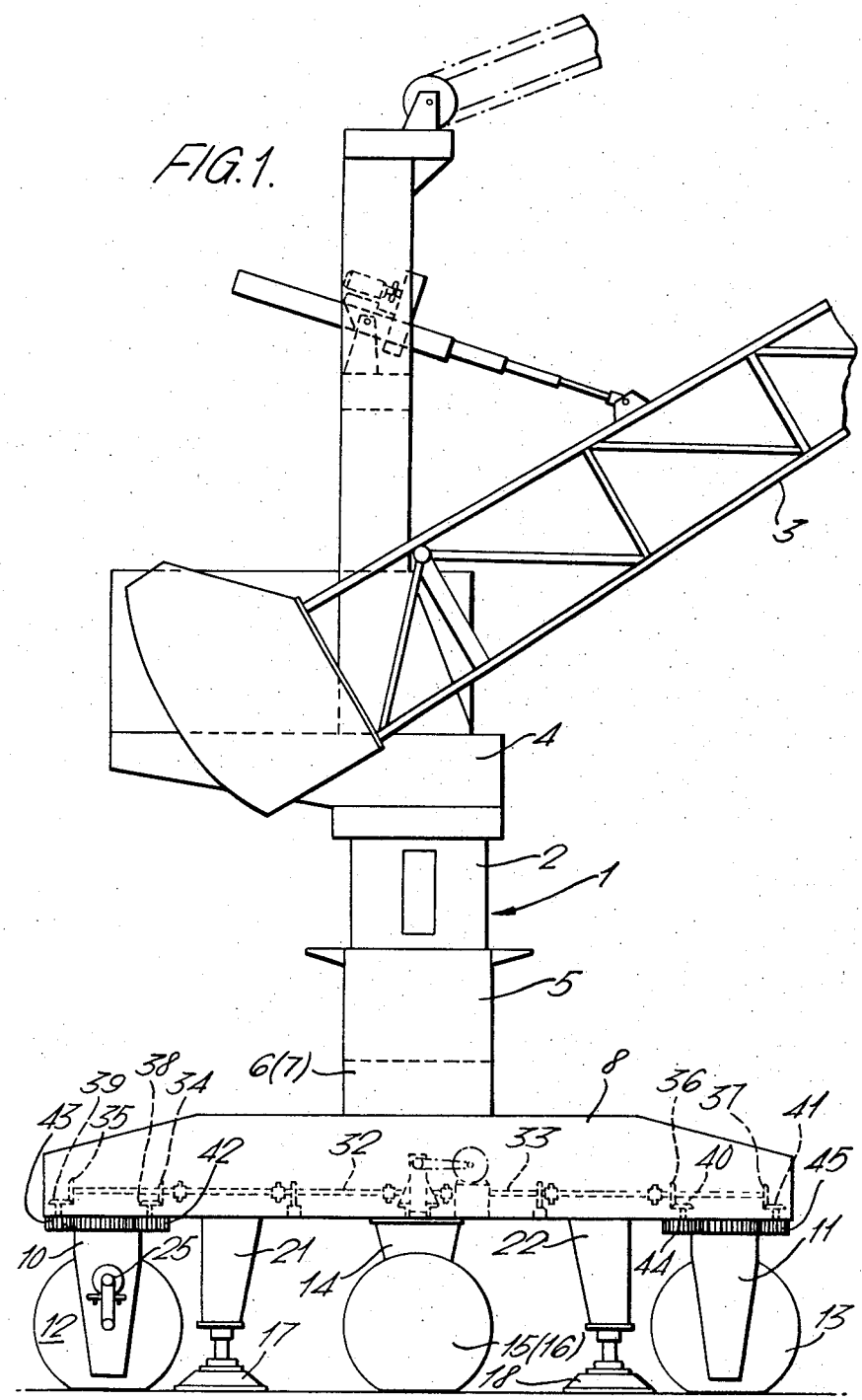

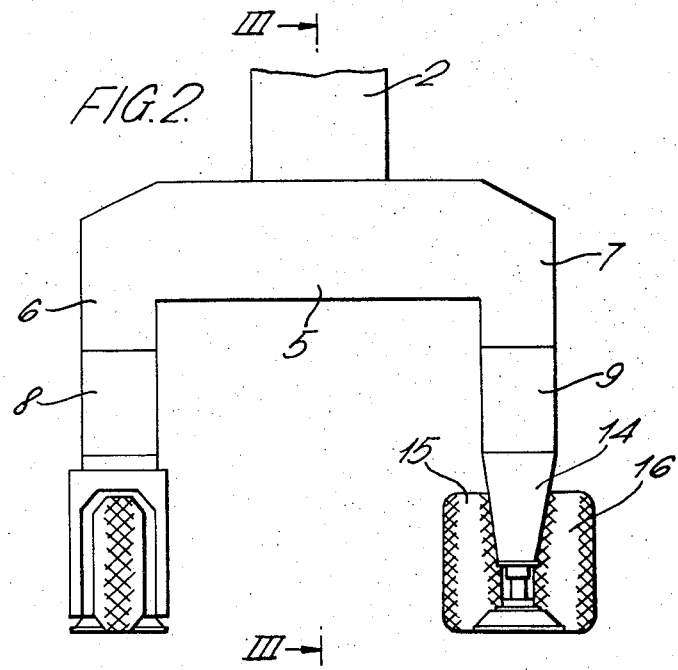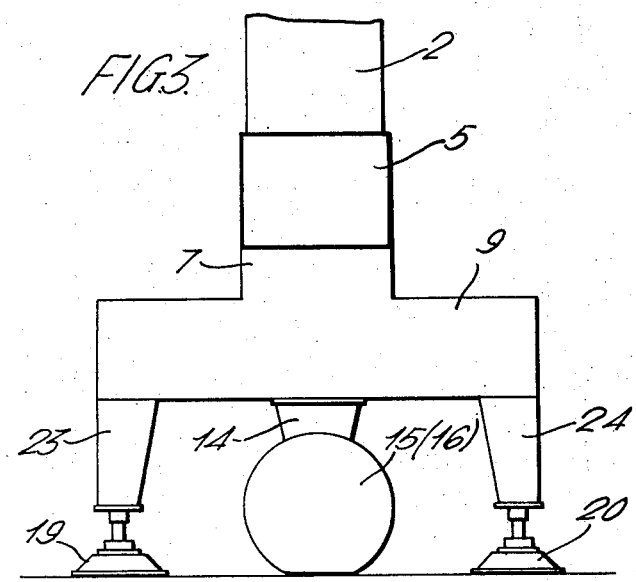

3,807,591

CRANE, TRANSPORT TRUCK AND THE LIKE, TRAVELLING ON TYRE WHEELS

The present invention relates to a vehicle such as a crane or transport truck travelling on tyre wheels.

The use of cranes, transport trucks and the like travelling on tyre wheels has been known for a long time. Such lifting and/or carrying means are necessary when same are to be given a relatively large movement freedom; for instance, when it is not convenient to restrict the action of the rail cranes to a given area of a wharf, or when the nature and size of the carried loads does not allow to follow fixed paths. Anyhow, it is to be noted that under any point of view the lifting and carrying means travelling on tyre wheels add to their own advantages of the lifting and carrying rail means, the advantage of a larger operative capacity, due to their larger freedom of movement.

However, said tyre-wheeled means have the disadvantage of being more expensive. In fact, while for the means intended to move along guide rails the only problem is to control the motion of the means, as the direction is defined by said rails which are always rectilinear, with the tyre-wheeled means, besides the problem of driving the wheels, there is the problem of controlling the rotation of the guide wheels about a substantially vertical axis to steer the vehicle.

The cranes, transport trucks and the like travelling on tyre wheels, of known type, comprise four or more wheels, one or more of which may be driving wheels. Practically, the driving wheels are always at least two and usually there are four independent driving wheels. In the latter case the number of turns of the four wheels cannot be equal in any moment, but must vary as a function of the curve radius of the path to be followed by the vehicle. In these circumstances, it is easy to understand that the control system of the driving wheels of said tyre-wheeled means is rather complicated and thus expensive and depends on the arrangement used for controlling the guide wheels.

According to a first of such systems, the pair of rear wheels comprises axes remaining coincident even when the means follows a non-rectilinear direction. Similarly to what occurs for passenger cars, the rotation of the vehicle is obtained by swerving the front wheels and when the control means is common for both front wheels, they must be coupled for the swerving motion by a parallelogram arrangement or by an equivalent mechanical arrangement preventing the guide wheels from sliding. Simultaneously, it is necessary to provide for a differential arrangement for the rear wheels if they are driving wheels. It is to be noted that such a system cannot be applied advantageously to cranes or transport trucks or large size, when the support base must comprise a large arc allowing the passage of large vehicles or loads to be carried, like containers, freight cars and the like.

Consequently the known tyre-wheeled cranes and transport trucks comprise independent steering means on the four wheels or actuated through complicated and expensive telecontrols. Also the driving wheels, in the number of two or even four, must comprise, according to such a solution, independent drive means.

The invention seeks to provide a vehicle in which a simple and effective steering means is provided and which allows good maneuverability and at the same time leaves a considerable free area below the vehicle to allow the passage of other equipment.

BRIEF DESCRIPTION OF THE DRAWINGS

The objects, advantages and characteristics of the invention will further result in the following specification referring to embodiments selected by way of example only with particular reference to the accompanying drawings wherein:

FIG. 1 is a side view of a crane according to the invention;

FIG. 2 is a partial front view of the crane of FIG. 1;

FIG. 3 is a section along the line III—III of FIG. 2;

DESCRIPTION OF THE PREFERRED EMBODIMENTS

Figure 4:
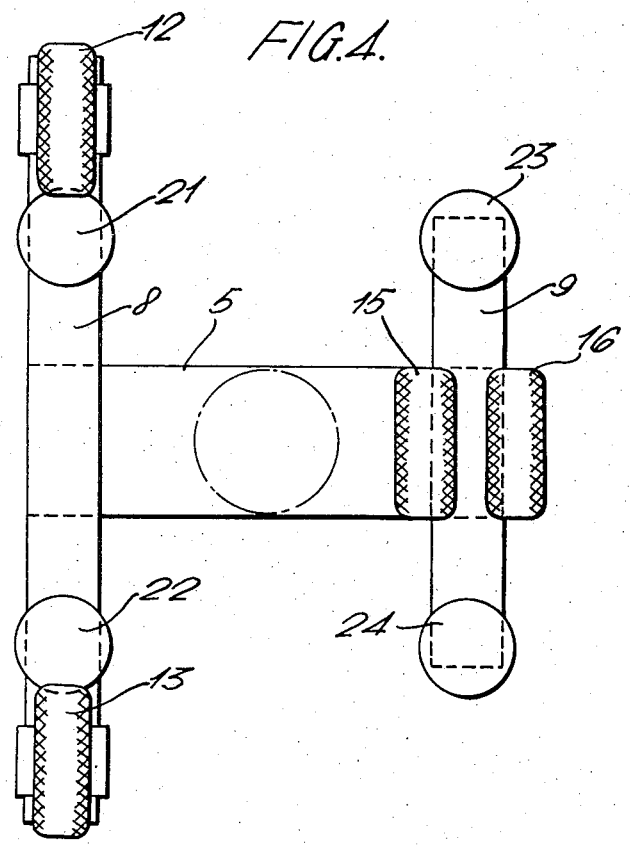
FIG. 4 is a view from the bottom.

With reference to FIGS. 1 to 5 and 9 to 14, numeral 1 is a crane whose operative tower 2, provided with an arm 3, is turnable around an axis 4 and rests on a support cross-bar 5 supported by uprights 6,7, which in their turn rest on two beams 8,9.

The group formed by elements 2 to 7 are known per se and for this reason are not described in detail herein. The beam 8 comprises at its ends two turnable supports 10 and 11, each shaped as a fork, for two tyre wheels 12 and 13; the beam 9 comprises, correspondingly to its intermediate position, a support 14 for a pair of wheels 15,16 with coincident axes arranged symmetrically with respect to said support 14. The use of two butted wheels serves to obtain a uniform distribution of the crane weights on the tyres, however instead of two butted wheels 15,16, from the point of view of the embodiment of the invention, it would be equivalent to use a single wheel suitably dimensioned for bearing the weight thereon in equal conditions of security with respect to those of wheels 12 and 13.

Generally, the tyre wheels of a crane of the type described serve to bear the weight of the unloaded crane when same is travelling. When on the contrary the crane must operate as a lifting and carrying menas for a load suspended on arm 3, the tyre wheels are excluded by lowering the supports or jacks 17 to 20 by means of corresponding hydraulic pistons which are inserted in the supports 21 to 24 arranged at the corners of a rectangular figure, and supported two by two by the beams 8 and 9.

Figure 12:
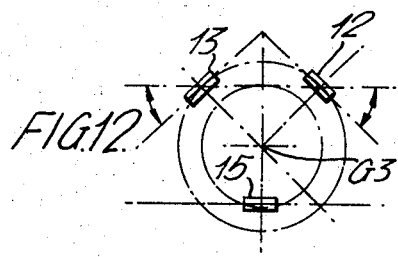
Figure 10:
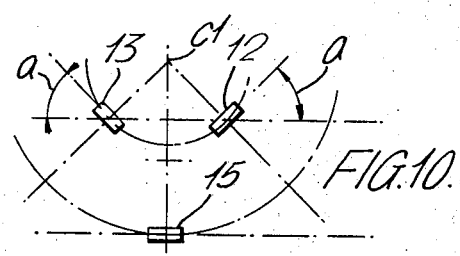
Figure 13:
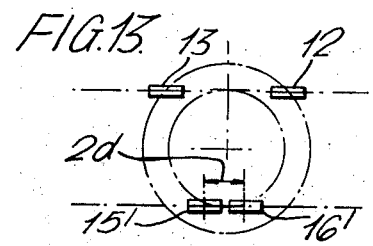
Figure 11:
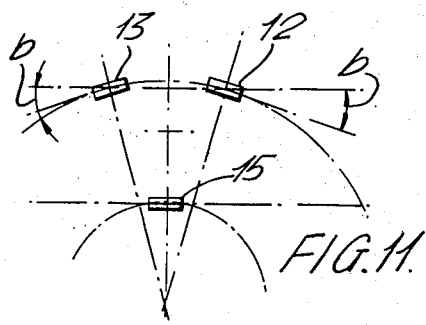
Figure 14:
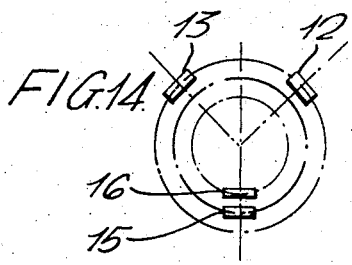

The three tyre wheels (the pair of wheels 15 and 16 is comparable to a single wheel, as above said) are provided with the following actuating mechanisms: wheel 15 (16) is idle about its own rotation axis, which however may rotate with respect to the beam 8 together with the support 11 around a vertical axis; the wheel 12 is the only driving wheel and is operated, through an appropriate transmission, by a drive means 25; further, wheel 12 with its axis and its fork 10 are turnable around a vertical axis with respect to the beam 8. The rotation of wheels 12 and 13, together with the relevant supports 10,11, around a vertical axis is always equal and opposite, as shown in FIGS. 12 to 14. Such a rotation constitutes wheels 12 and 13 as steering wheels which, by swerving, permit the crane 1 to follow a desired path.

Figure 9:
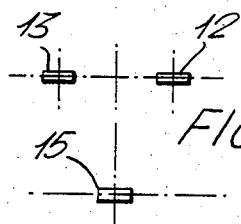
FIGS. 9 to 14 show diagrammatically various swerving positions of the tyre wheels of the cranes or transport truck according to the invention, with particular reference to some variations.

In the position shown in FIG. 9, wheels 12 and 13 causes a rectilinear displacement of the crane 1. In the position shown in FIG. 10, wheels 12 and 13 forms angles (a) equal and opposed; in this case the extensions of the axes of wheels 12,13 and 15 meet in a point C1 outside the beam 8, such a point C1 constituting the instantaneous center of the trajectory described by crane 1. By rotating wheels 12 and 13 for an angle (b) equal and opposed and directed in opposite direction with respect to said angles (a), the crane 1 moves along a curved path, whose instantaneous center is constituted by a point C2 outside said beam 8. When the room available for maneuvering is reduced, the crane according to the invention is able to rotate around a point G3 coincident e.g., with the projection of the axis as seen in FIG. 12. Therefore, the handling of the crane is very easy.

By using instead of a single wheel 15, two wheels 15 and 16, with coincident axes, the characteristics of the crane do not change; therefore the operation is similar to that shown in FIGS. 9 to 12, and once more when the crane does not follow a rectilinear path all its wheels roll instead of sliding.

Figure 6:
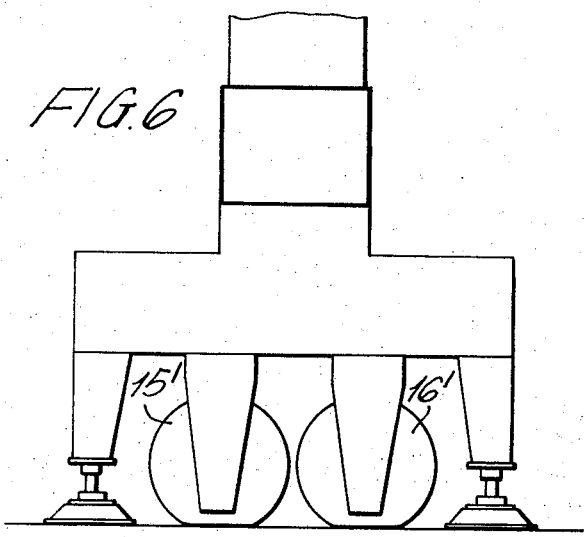
FIG. 6 is a section similar to the one of FIG. 3, but referring to a different embodiment.

According to the variation shown in FIGS. 13 and 6, the axes of wheels 15 and 16 are not coincident, but between them there is a distance (2d). However, as such a distance is small in comparison to the distance of the beams 8 and 9 and to that of the axes of wheels 12 and 13, from a kinematic point of view the operation of wheels 15' and 16' is still comparable to the one of wheels 15 and 16 of FIGS. 14 and 3: during a non-rectilinear trajectory of crane 1, the sliding of wheels 15' and 16' is negligible. It is to be appreciated that the embodiments shown in FIGS. 9 to 12 and 14 are the preferable ones, while the embodiment shown in FIG. 13 may be convenient only in given conditions.

As above said, out of the three wheels only wheel 12 is a driving wheel, and further the guide wheels 12 and 13 are actuated by a single mechanism arranged inside the beam 8, whereby the size of the arc defined by the crossbar 5 and the uprights 6 and 7 is not restricted.

The steering mechanism comprises (see FIG. 1 and particularly FIG. 5) a drive means actuating the input shaft 30 of a reducer 31 which is provided with two coaxial output shafts 32 and 33 which are rotatable in the same direction, and by means of which is controlled the rotation of the conical pinions or bevel gears 34,35 and 36,37 respectively which, on their turn, engage conical or bevel pinions 38,39 and 40,41 respectively. The pinions 38 to 41 are integral with corresponding cylindrical toothed wheels 42 to 45 (see FIG. 1) which, two by two actuate the rotation of two large toothed wheels 46 and 47 solidly connected on corresponding thrust bearings by means of which the supports 11 and 10 carry the weight of beam 8.

Figure 5:
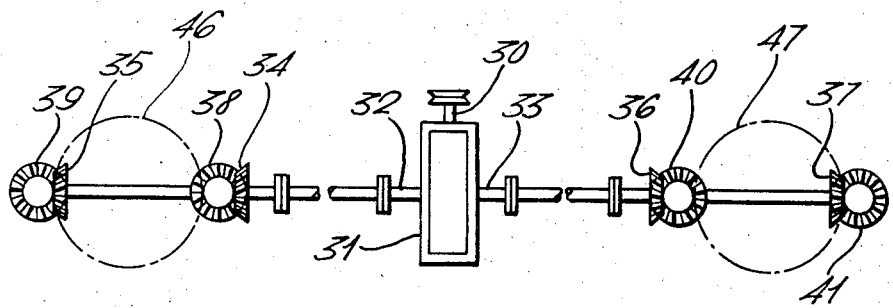
FIG. 5 is a diagrammatic plan view of the swerving device of the crane according to the invention.

It is to be noted that by the steering device shown in FIG. 5, the wheels 12 and 13 are always made to be steered through equal and opposed angles.

Figure 8:
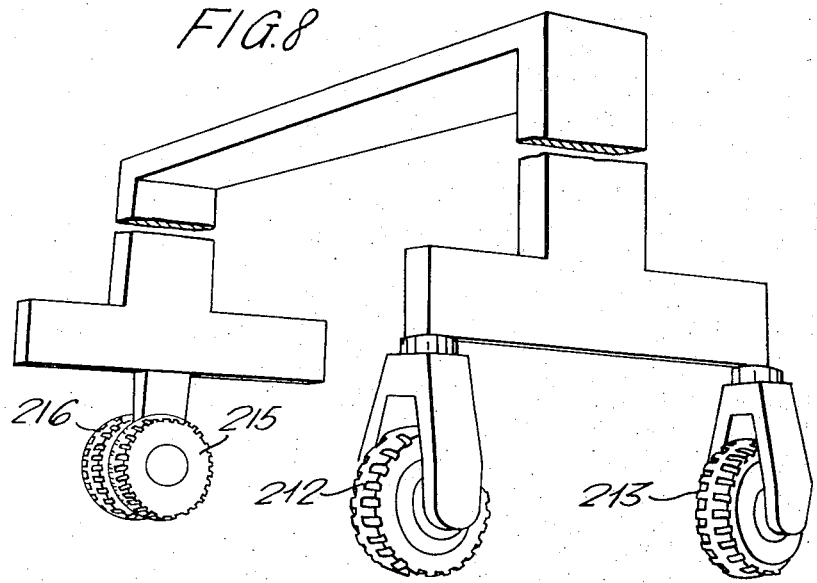
FIG. 8 shows another embodiment of a truck having substantially the shape of the base of the crane shown in FIGS. 1 to 6.
Figure 7:
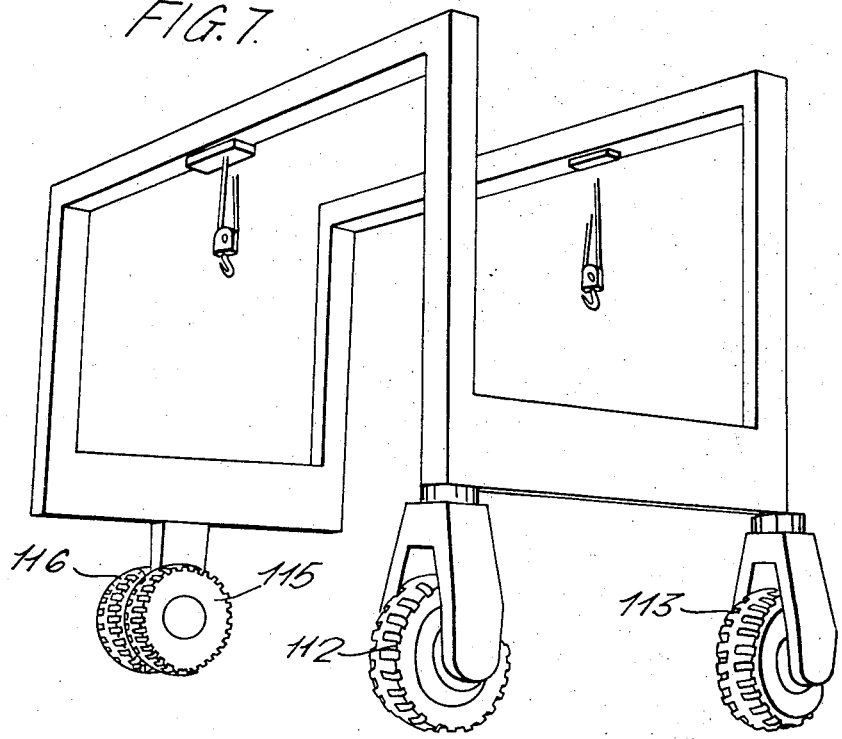
FIG. 7 shows a transport truck according to the invention.

Further, thanks to the double presence of the conical pinions and cylindrical toothed wheels which transmit the movement from shafts 32 and 33 to the toothed wheels 46 and 47 respectively, the latter may work in optimum conditions since the torque exerted on them is performed through two equal and oiposed forces instead of through a single eccentric force with respect to the rotation axes of supports 10 and 11. FIGS. 7 and 8 refer to two variations concerning transport trucks. However, the wheels 112,113,115,(116) and 212,213,215 (216) respectively, operate in a similar way with respect to what shown with reference to the previously described wheels 12,13,15,16.

It is to be understood that the invention is not limited to the examples shown, but it is intended to cover all modifications and equivalents within the scope of the appended claims.

What we claim is:

1. A vehicle comprising a frame and a first ground engaging wheel means disposed on one side of the longitudinal axis of the vehicle and rotatable about a transverse horizontal axis, two steerable wheel means aligned one behind the other on the other side of said longitudinal axis and rotatable upon spaced horizontal axes, at least one of said two steerable wheel means having drive means connected thereto for turning said wheel means about said horizontal axis to propel the vehicle, said first ground engaging wheel means being equally spaced intermediate said steerable wheel means, steering means associated with said steerable wheel means turning said steerable wheel means about vertical axes passing therethrough, said steerable wheel means being turnable about said vertical axes through equal and opposite angles so that the horizontal axes about which said steerable wheel means turn, intersect in a vertical plane including the horizontal axis about which said first ground engaging wheel means turn, said steering means comprising a drive means drivingly connected to rotate two generally horizontal coaxial shafts each shaft carrying a pair of spaced bevel gears, each bevel gear of each shaft engaging a corresponding one of two bevelled pinions, said pinions being rotatable about vertical axes and said pinions being drivingly connected with a gear rotatable about a vertical axis and secured through the intermediary of thrust bearings to a corresponding one of said steerable wheel means to rotate them through equal and opposite angles about said vertical axes thereof.

2. A vehicle according to claim 1, wherein said first ground engaging wheel means comprises two or more butted wheels having parallel and coincident axes.

3. A vehicle according to claim 1, wherein said first ground engaging wheel means comprises two or more wheels with parallel and coincident axes disposed immediately adjacent to one another, whereby they act in a manner of a single wheel.

4. A vehicle according to claim 1, wherein the steerable wheel means is connected to a longitudinal beam within which said steering means is disposed.

5. A vehicle according to claim 1, comprising a carrying structure consisting of two longitudinal beams one of which supports said steerable wheel means and the other of which supports said first ground engaging wheel means each of said two beams, on the upper side thereof having an upright, said uprights being connected by a crossbar which serves as a support for material handling means.

6. A vehicle according to claim 5, wherein each of said beams is provided with hydraulic pistons having articulated support legs capable of bearing the weight of the vehicle said legs being movable by said pistons between operative, vehicle supporting positions and inoperative, non-supporting positions.

* * * * *